(12) United States Patent
Cazals et al.

(10) Patent No.: US 7,905,449 B2
(45) Date of Patent: Mar. 15, 2011

(54) MULTI-ENGINE AIRCRAFT

(75) Inventors: Olivier Cazals, Daux (FR); Jaime Genty de la Sagne, Toulouse (FR); Denis Rittinghaus, Toulouse (FR)

(73) Assignee: Airbus France, Toulouse (FR)

( * ) Notice: Subject to any disclaimer, the term of this patent is extended or adjusted under 35 U.S.C. 154(b) by 271 days.

(21) Appl. No.: 11/632,225

(22) PCT Filed: Jun. 29, 2005

(86) PCT No.: PCT/FR2005/001649
§ 371 (c)(1),
(2), (4) Date: Jan. 11, 2007

(87) PCT Pub. No.: WO2006/016031
PCT Pub. Date: Feb. 16, 2006

(65) Prior Publication Data
US 2008/0073459 A1    Mar. 27, 2008

(30) Foreign Application Priority Data
Jul. 15, 2004   (FR) ..................... 04 07863

(51) Int. Cl.
*B64D 27/00* (2006.01)
(52) U.S. Cl. ............. 244/55; 244/53 R; 244/54; 244/58; 244/60
(58) Field of Classification Search ............. 244/55, 244/53 R, 54, 58, 60
See application file for complete search history.

(56) References Cited

U.S. PATENT DOCUMENTS

| 3,139,244 | A | * | 6/1964 | Bright ..................... 244/12.3 |
| 3,652,035 | A | * | 3/1972 | Fredericks .............. 244/12.1 |
| 3,666,211 | A |   | 5/1972 | Cathers et al. |
| 3,693,910 | A | * | 9/1972 | Aldi ......................... 244/7 A |
| 3,860,200 | A | * | 1/1975 | Petrushka ............... 244/207 |
| 3,869,102 | A | * | 3/1975 | Carroll .................... 244/36 |
| 3,936,017 | A |   | 2/1976 | Blythe et al. |
| 3,966,142 | A | * | 6/1976 | Corbett et al. .......... 244/12.4 |
| 4,004,761 | A | * | 1/1977 | McAvoy .................. 244/100 A |
| 4,379,533 | A | * | 4/1983 | Caldwell et al. ........ 244/118.1 |

(Continued)

FOREIGN PATENT DOCUMENTS
EP     1069044    1/2001
(Continued)

OTHER PUBLICATIONS
PCT International Search Report dated Nov. 18, 2005.
(Continued)

*Primary Examiner* — Tien Dinh
*Assistant Examiner* — Justin Benedik
(74) *Attorney, Agent, or Firm* — Dickinson Wright PLLC

(57) ABSTRACT

A multi-engine aircraft includes at least two first engines and a third engine located at a rear part of the fuselage, containing rear tail sections, along a vertical longitudinal plane of symmetry of the fuselage. The rear tail sections define a channel which is symmetrical with respect to the longitudinal plane of the fuselage. The third engine is arranged in the plane of symmetry of the channel corresponding to the longitudinal plane and is mounted on the upper part of the fuselage in a raised manner and in front of the tail sections, so that the outlet of the third engine is situated substantially at the inlet of the channel defined by the tail sections.

12 Claims, 5 Drawing Sheets

U.S. PATENT DOCUMENTS

| | | | |
|---|---|---|---|
| 4,447,022 A * | 5/1984 | Lion | 244/13 |
| 4,924,228 A * | 5/1990 | Novak et al. | 342/2 |
| 4,998,689 A * | 3/1991 | Woodcock | 244/46 |
| 5,890,441 A * | 4/1999 | Swinson et al. | 244/12.3 |
| 6,129,306 A * | 10/2000 | Pham | 244/2 |
| 6,244,537 B1 * | 6/2001 | Rutherford | 244/7 A |
| 6,293,493 B1 * | 9/2001 | Eichstedt et al. | 244/30 |
| D530,658 S * | 10/2006 | Vigneron et al. | D12/319 |
| 2003/0168552 A1 * | 9/2003 | Brown | 244/55 |
| 2009/0065632 A1 * | 3/2009 | Cazals | 244/15 |

FOREIGN PATENT DOCUMENTS

| | | |
|---|---|---|
| FR | 1047027 | 12/1953 |
| GB | 1243392 | 8/1971 |
| GB | 1397068 | 6/1975 |

OTHER PUBLICATIONS

Steinke.: "Aus Der Trickkiste Der Flugzeugentwickler Airbus-Konzepte Fuer Ueberrmorgen," Flug Revue, Stuttgart, DE, vol. 1/2001, Jan. 2001, pp. 22-25, XP009053625, p. 24, col. 1-3.

* cited by examiner

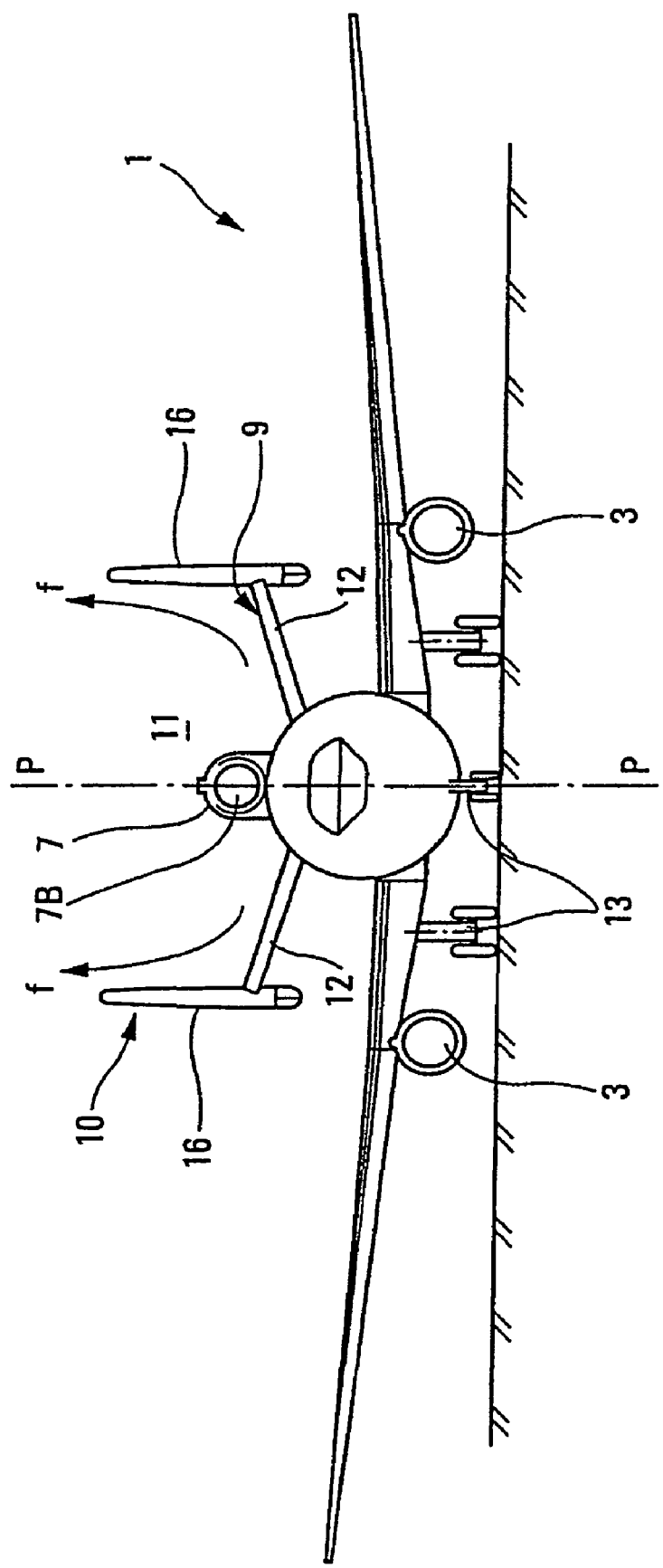

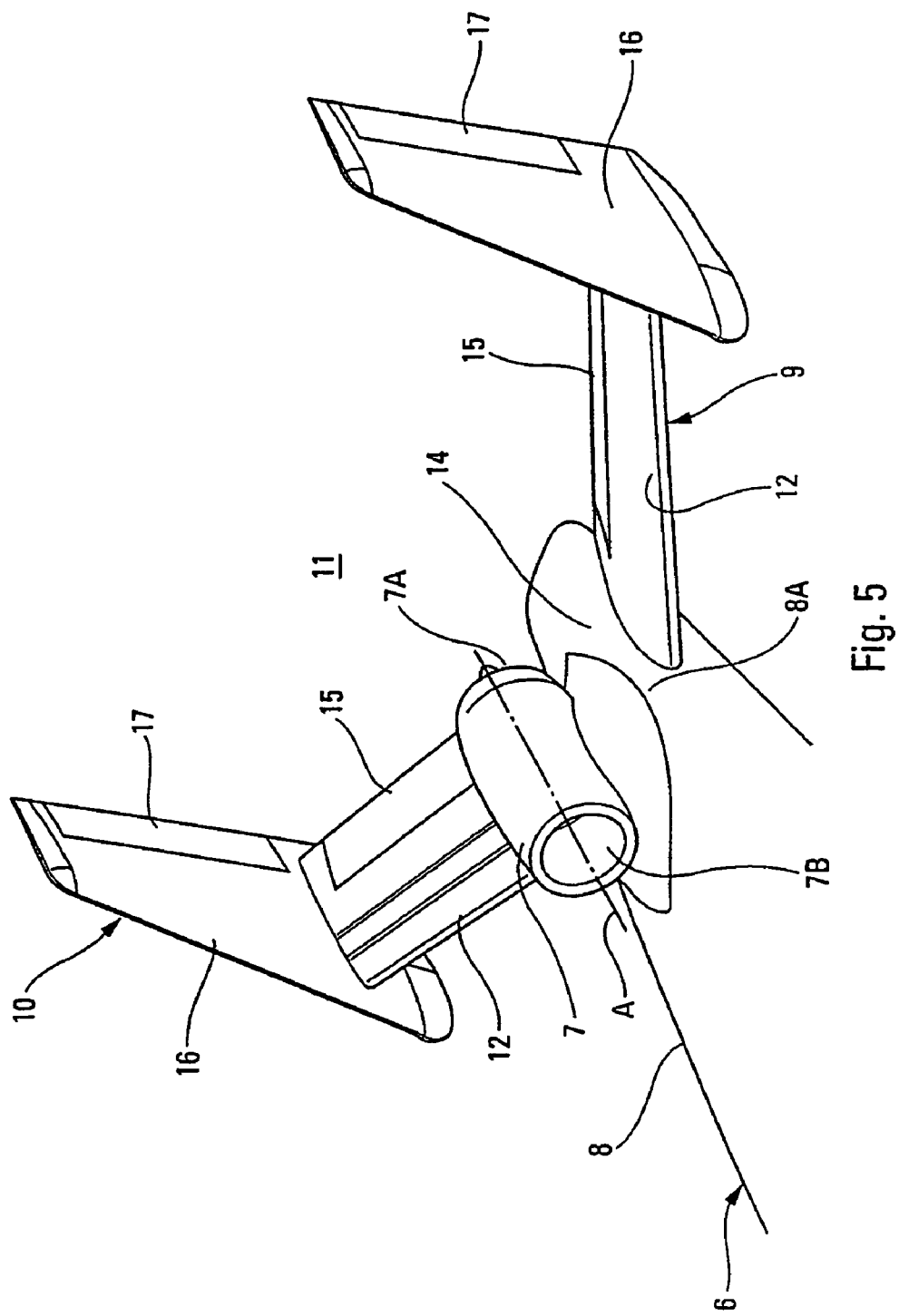

MULTI-ENGINE AIRCRAFT

FIELD OF THE INVENTION

The present invention relates to a multi-engine aircraft and more specifically, although not exclusively, to an aircraft equipped with three engines, two of which are joined respectively to the fuselage wings symmetrically with respect to the vertical longitudinal plane of said fuselage and the third of which is provided in the rear part of the fuselage in the region of the rear tail sections.

BACKGROUND OF THE RELATED ART

Aircraft equipped with three engines and having the construction summarized above, such as the LOCKHEED L1011 and the McDONNELL DOUGLAS DC-10 or MD-11, are already known. In particular, the third engine is situated, structurally and geometrically, between the horizontal tail section and the vertical tail section and carries the fin of said vertical tail section. These aircraft, the design of which dates back to the 1970s, and some of which are still in service, are equipped with powerful engines to provide long-haul services; however, given the era in which they were designed, these engines generate considerable noise and entail a high fuel consumption. Specifically, the noise generated by the third engine is particularly disturbing to passengers situated in the rear of the cabin, and also to residents living near airports when the aircraft is in the landing or takeoff phase, since the placement of this third engine means that the noise is diffused all around the aft portion of the fuselage.

Hence, this construction has gradually been abandoned to be replaced by a simpler construction of the twin-jet type, resulting in equal performance.

What is currently happening, with the exception of very long-haul aircraft, of the AIRBUS A-340 and BOEING 747 type, is that airliners are mostly being constructed with two engines, such as turbofans, borne symmetrically and respectively by the fuselage wings. Advances in technology which have made it possible to develop particularly powerful high-performance turbofans mean that these twin-jet aircrafts are able not only to make short-haul and medium-haul flights, but the largest of them are also certified to perform long-haul flights in complete safety despite only using two engines, and even despite malfunctioning of one of them.

However, on the other hand, these powerful turbofans have an ever-increasing mass and size, thereby making it necessary for the aircraft structure (fuselage, wings and landing gear in particular) to be designed accordingly so that it can withstand the stresses, and, by virtue of their oversizing, said jet engines also generate a significant noise level both for passengers and residents living near airports (in the takeoff and landing phase), this in spite of the advances made in this field by engine manufacturers.

SUMMARY OF THE INVENTION

The object of the present invention is to overcome these disadvantages.

To this end, according to the invention, the multi-engine aircraft comprising at least two first engines and a third engine which is provided at the rear part of the fuselage, containing the rear tail sections, along the vertical longitudinal plane of symmetry of the fuselage, said rear tail sections defining a channel which is symmetrical with respect to said longitudinal plane of the fuselage, and said third engine being arranged in the plane of symmetry of said channel corresponding to said longitudinal plane and being mounted on the upper part of said fuselage in a raised manner and in front of said tail sections, so that the outlet of this third engine is situated substantially at the inlet of said channel defined by said tail sections, is noteworthy in that said two first engines are joined to the fuselage wings respectively and symmetrically with respect to the vertical longitudinal plane of symmetry of said fuselage, in that said rear tail sections defining said channel include a horizontal tail section provided with stabilizers, and in that said stabilizers of the horizontal tail section are slightly inclined symmetrically toward the rear of said fuselage so as to form, when viewed in a horizontal plane perpendicular to said vertical longitudinal plane, an open V whose point corresponds to their connection to the rear part of said fuselage.

Thus, by virtue of the invention, the design of the rear tail sections and the arrangement of the third engine at the inlet of the channel makes it possible to considerably reduce the previous acoustic problems, since the noise generated by the third engine of the fuselage is sucked up by the channel so as to be discharged along the latter and upwardly away from the fuselage, that is to say away from passengers situated in the rear of the cabin and a fortiori away from residents living near airports. The noise generated is thus masked by the rear tail sections of the fuselage, which constitute an acoustic shield.

Consequently, since the invention partially overcomes the problems connected with noise nuisance, it is possible to return to a three-engine construction and thus design aircraft advantageously equipped with wing engines which are dimensionally smaller, and therefore less heavy and less noisy, while retaining an overall power which is analogous to a twin-jet aircraft equipped with large engines.

Moreover, the use of three engines does not entail an increase in the mass of the aircraft by comparison with an aircraft having two engines (since the wing engines are smaller), and the additional mass connected with the design of the channel defined by the rear tail sections is largely compensated for by the drop in the mass of the landing gear, the reason being that the landing gear is dimensionally smaller and less voluminous given the smaller engines.

Preferably, said channel defined by the rear tail sections has the approximate shape of a U whose base corresponds to the two stabilizers of the horizontal rear tail section which emerge respectively on either side of the rear part of said fuselage, whereas the lateral branches correspond to the two fins of the vertical rear tail section which are situated at the end of said stabilizers.

According to another variant, said rear tail sections can form an H in which the upper part of said H corresponds to said channel.

Advantageously, said third engine arranged in front of said channel is arranged in such a way that its geometric axis, contained in said vertical longitudinal plane of symmetry, passes in the vicinity of the base of said channel. Thus, the gases exiting the engine are "captured" in the bottom position of the channel and flow along the tail sections, losing some of their intensity in the process.

Preferably, the upper portion of the rear part of said fuselage is flattened in a plane which is perpendicular to said vertical longitudinal plane of symmetry of the fuselage. Thus, when the said channel is U-shaped, the horizontal tail section prolongs the flattened rear part of the fuselage in a substantially continuous manner.

Moreover, to enable the gases exiting the engine to be optimally sucked up by the channel, and thus to maximize masking of the noise generated, said stabilizers of the horizontal tail section are slightly inclined symmetrically in an upward direction so as to form, when viewed in a vertical plane perpendicular to said vertical longitudinal plane, an open V whose point corresponds to their connection to the rear part of said fuselage.

Furthermore, it is known for civil aircraft to be equipped with an auxiliary power generator, in addition to the engines, particularly for the operation of ancillary systems when the aircraft is on the ground. According to the invention, said third engine can actuate the auxiliary power generator.

In addition, the third engine may be identical to or different than the two wing engines.

BRIEF DESCRIPTION OF THE DRAWINGS

The figures of the appended drawing will make it clearly understood how the invention can be implemented. In these figures, identical references are used to denote like elements.

FIGS. 2, 3 and 4 show respective side, plan and front views of said aircraft represented in FIG. 1.

FIG. 5 is an enlarged perspective view of the rear part of said fuselage, equipped with the third engine.

DETAILED DESCRIPTION OF THE INVENTION

Figure 1:
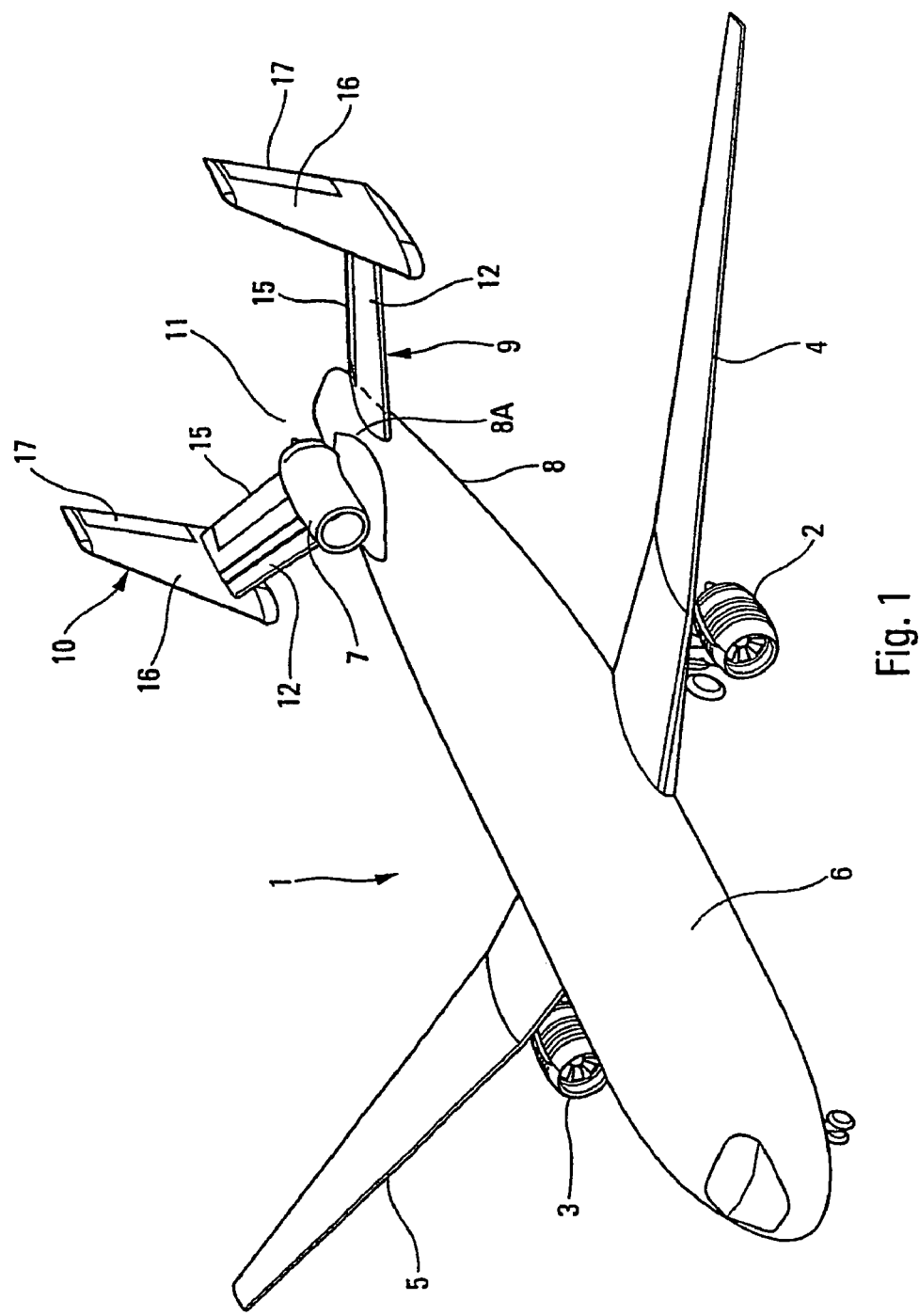
FIG. 1 is a perspective view of an exemplary embodiment of the multi-engine aircraft according to the invention.

In the exemplary embodiment represented in FIGS. 1 to 4, the aircraft 1 comprises three engines (of the turbofan type), two 2, 3 of which are arranged below the wings 4, 5 of the fuselage 6, respectively, symmetrically with respect to the vertical longitudinal plane of symmetry P of said fuselage, and the third 7 of which is provided at the rear part 8 of the fuselage, containing the horizontal and vertical rear tail sections 9 and 10, along the longitudinal plane P. The reference number 13 represents the customary landing gear of such an aircraft.

As is shown more specifically in FIGS. 1, 4 and 5, the horizontal 9 and vertical 10 tail sections define, according to the invention, a channel 11 which is, in this example, approximately U-shaped and which is geometrically symmetrical with respect to the longitudinal plane P of the fuselage 6. The third engine 7 is then arranged in the plane of symmetry of the channel, that is to say the plane P, and is advantageously arranged in the upper portion 8A of the rear part 8 of the fuselage, in front of the horizontal 9 and vertical 10 tail sections, so that its outlet 7A is situated at the inlet of the channel 11, as is shown in particular in FIGS. 2 and 3.

Structurally, the horizontal tail section 9 is composed of two stabilizers 12 fixedly attached to the rear part of the fuselage and arranged symmetrically and respectively on either side of its plane P. These stabilizers define the base of the U of said channel 11 and, to provide optimum channeling of the propagation of the noise generated by the engine, they are inclined upwardly and rearwardly with respect to the fuselage.

It can thus be seen in FIGS. 1, 4 and 5 that the stabilizers 12 are slightly upwardly inclined symmetrically with respect to the horizontal so as to form a widely open V whose point corresponds to the region 14 of the rear part of the fuselage which connects them. The base of the U-shaped channel 11 is thus slightly concave. Moreover, these stabilizers 12 are also inclined symmetrically in the rearward direction, when viewed from above as in FIG. 3, so as to form a widely open V which emanates from the fuselage and whose point corresponds to the connection region 14. Of course, the stabilizers 12 of the horizontal tail section 9 are provided with respective elevators 15.

With respect to the vertical tail section 10, it is composed of two fins 16 which are symmetrical with respect to the plane P and which are fixedly attached to the tip of the free ends of the stabilizers 12, which ends are opposed to those ends emerging from the fuselage. These fins 16 are arranged vertically, parallel to one another, and define the lateral branches of the U of said channel, in the manner shown particularly in FIG. 4. Rudders 17 are additionally provided at the rear edge of the fins, and the front edge of these fins is inclined such that each fin, viewed in plan as in FIG. 2, narrows in the direction of its upper end edge.

Moreover, the upper portion 8A of the rear part 8 of the fuselage is slightly flattened in a plane which is perpendicular to the vertical longitudinal plane P, so that the stabilizers 12 of the horizontal tail section approximately follow the upper profile of the thus flattened connection region 14 of the rear part, as shown particularly in FIG. 5.

The third engine 7, which is arranged in front of the channel defined by the tail sections 9, 10, is arranged in such a way that its horizontal geometric axis A, which is contained in the plane P, passes in the bottom portion of the U of said channel.

Figure 2:
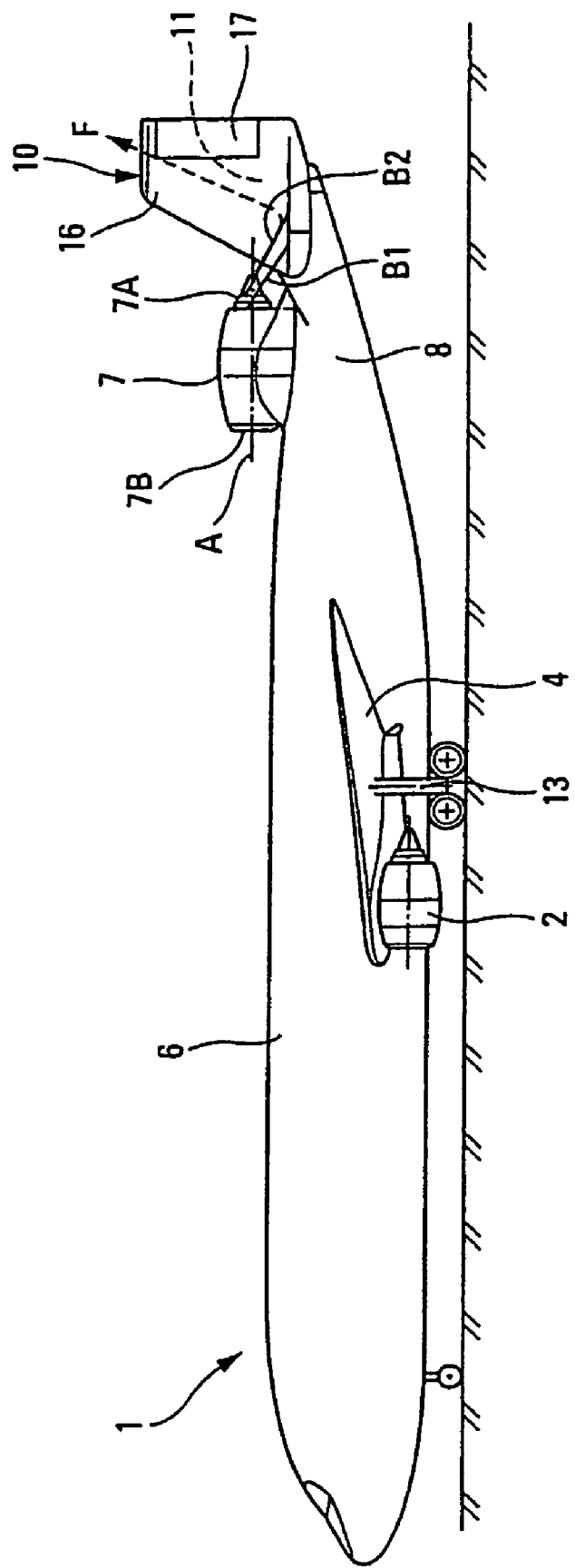

Hence, to make that possible, the third engine is mounted in a raised manner with respect to the flattened rear part of the fuselage so that its inlet 7B is situated above the fuselage, as shown in FIGS. 2 and 4, and so that its outlet 7A opens into the bottom portion of the U of said channel 11, that is to say in the vicinity of, but at a distance from, the region 14 of connection with the horizontal tail section.

Figure 3:
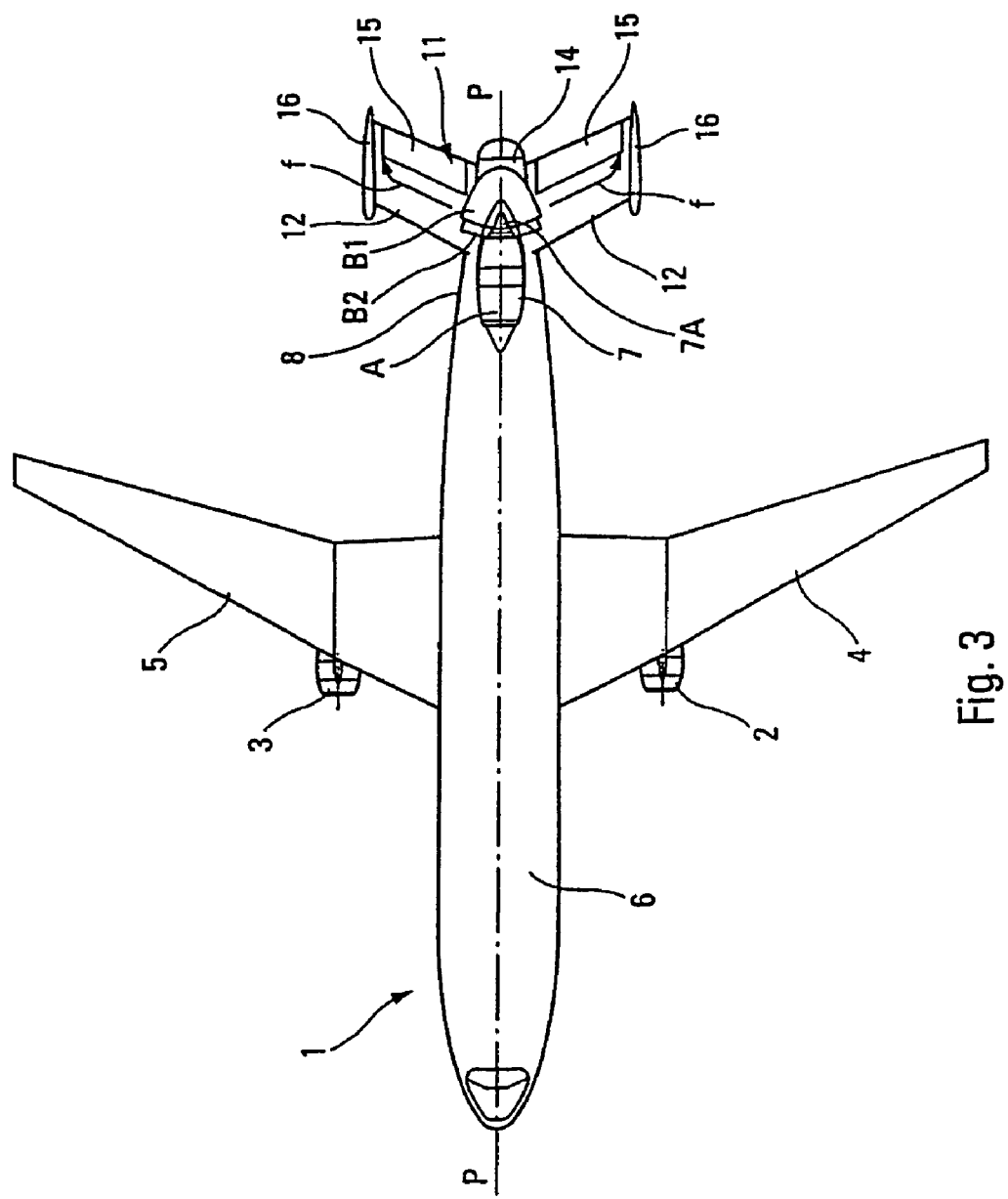

Thus, the temperature of the gases exhausted by the nozzle of the engine 7 does not affect the surrounding structure, whereas the acoustic waves generated are directed toward the channel 11 with the profiles indicated schematically at B1 and B2 (see below) in FIGS. 2 and 3.

Owing to the combination of the tail sections in the form of a U-shaped channel 11 and the arrangement of the third engine 7 in front of the channel in its plane of symmetry, the acoustic problems connected with the placement of this engine are largely solved, since the acoustic waves generated by the engine and exiting the nozzle and the fan (references B1 and B2 respectively in FIGS. 2 and 3) are diffused, with the profiles indicated, over the flattened end 14 of the rear part 8 of the fuselage and over the stabilizers 12 so as to rise, in the direction of the arrows f as indicated schematically (FIGS. 2 to 4), by way of the open V-shaped arrangement of said stabilizers, toward and along the vertical fins 17, from where they are discharged upwardly and rearwardly, that is to say away from the rear passengers and a fortiori away from the residents living near airports.

Using a third engine thus makes it possible to use two engines under the wings whose thrust is less than that of customary twin-engine aircraft, and which are therefore less noisy and have less mass, so that the size and the mass of the landing gear 13 (main and nose) can be reduced, the drop in mass largely compensating for the additional mass caused by the U-shaped tail sections.

Moreover, the third engine can also be used to actuate the auxiliary power generator.

Of course, the third engine could have a power which is different than the other two wing engines.

The invention claimed is:

1. A multi-engine long-haul aircraft comprising at least two first turbofan engines and a third turbofan engine which is provided at a rear part of a fuselage of the multi-engine aircraft, the fuselage connected to rear tail sections each respectively comprising a horizontal tail section and a vertical tail section, said vertical tail section oriented parallel to a vertical longitudinal plane of symmetry of the fuselage, said rear tail sections defining a channel which is symmetrical with respect to said longitudinal plane of the fuselage, and said third turbofan engine being arranged in a plane of symmetry of said channel corresponding to said longitudinal plane and being mounted on an upper part of said fuselage in a raised manner and in front of said tail sections, so that an outlet of the third turbofan engine is situated at least partially in and extending forward of an inlet of said channel defined by said rear tail sections, wherein said two first turbofan engines are joined to fuselage wings respectively and symmetrically with respect to the vertical longitudinal plane of symmetry of said fuselage, said horizontal tail sections each comprise stabilizers, and said stabilizers of the horizontal tail section are slightly inclined symmetrically toward a rear section of said fuselage so as to form, when viewed in a horizontal plane perpendicular to said vertical longitudinal plane, an open V-shape comprising a center point corresponding to a section where said stabilizers connect to the rear part of said fuselage and having lateral branches which correspond to two fins of the vertical rear tail sections which are situated at distal ends of said stabilizers.

2. The aircraft as claimed in claim 1, wherein said channel defined by the rear tail sections has the approximate shape of a U having a base which corresponds to the two stabilizers of the horizontal rear tail sections which emerge respectively on either side of the rear part of said fuselage.

3. The aircraft as claimed in claim 1, wherein said rear tail sections form an H-shape in which an upper part of said H corresponds to said channel.

4. The aircraft as claimed in claim 1, wherein said third turbofan engine arranged in front of said channel is arranged in such a way that a geometric axis of said third engine, contained in said vertical longitudinal plane of symmetry, passes through a base of said channel.

5. The aircraft as claimed in claim 1, wherein the upper portion of the rear part of said fuselage is flattened in a plane which is perpendicular to said vertical longitudinal plane of symmetry of the fuselage.

6. The aircraft as claimed in claim 1, wherein said stabilizers of the horizontal tail section are inclined symmetrically in an upward direction so as to form, when viewed in a vertical plane perpendicular to said vertical longitudinal plane, an open V-shape
comprising a center point corresponding to a section where said stabilizers to the rear part of said fuselage.

7. The aircraft as claimed in claim 1, wherein said turbofan engines are identical.

8. The aircraft as claimed in claim 1, wherein said third turbofan engine is different than the other two wing turbofan engines.

9. A method to reduce a noise level emitted by a long-haul aircraft equipped with two wing engines, the two turbofan wing engines being symmetrical to each other with respect to a vertical longitudinal plane of symmetry of a fuselage of said aircraft, the method comprising:
   reducing a power output of each of said two turbofan wing engines;
   equipping a fuselage tail with rear tail sections defining a channel, which is symmetrical with respect to said vertical longitudinal plane of the fuselage and which has lateral branches which correspond to two fins of the rear tail sections and are situated at distal ends of corresponding stabilizers; and
   mounting a third turbofan engine on an upper part of the fuselage tail so that said third turbofan engine:
      is arranged in a raised position with respect to the upper part of the fuselage tail, and
      is disposed in front of said rear tail sections, so that an outlet of said third turbofan engine is disposed at least partially in and extending forward of an inlet of said channel.

10. The aircraft as claimed in claim 1, wherein acoustic waves generated by the turbofan engine and exiting a nozzle and fan are diffused.

11. The aircraft as claimed in claim 1, wherein the vertical tail section extends forward, aft and downward from the horizontal tail section.

12. The method as claimed in claim 9, wherein the vertical tail section extends forward, aft and downward from the horizontal tail section.

* * * * *